United States Patent [19]

Froberg

[11] 4,007,027
[45] Feb. 8, 1977

[54] METHOD AND APPARATUS FOR MAKING GLASS

[75] Inventor: Magnus L. Froberg, Granville, Ohio

[73] Assignee: Owens-Corning Fiberglas Corporation, Toledo, Ohio

[22] Filed: Feb. 12, 1976

[21] Appl. No.: 657,651

Related U.S. Application Data

[63] Continuation-in-part of Ser. No. 526,876, Nov. 25, 1974, abandoned.

[52] U.S. Cl. .............................. 65/136; 65/121; 65/178; 65/335; 65/337; 65/346
[51] Int. Cl.² .................................. C03B 5/18
[58] Field of Search ............. 65/134, 135, 136, 178, 65/179, 180, 335, 337, 346, 347, 121

[56] References Cited
UNITED STATES PATENTS

| | | |
|---|---|---|
| 2,817,191 | 12/1957 | Hamilton ................. 65/179 X |
| 3,466,160 | 9/1969 | Keefer ...................... 65/121 X |
| 3,482,955 | 12/1969 | Monks ...................... 65/121 X |
| 3,663,245 | 5/1972 | Bryson ........................ 106/52 |
| 3,942,968 | 3/1976 | Pieper ......................... 65/134 |

Primary Examiner—Arthur D. Kellogg
Attorney, Agent, or Firm—John W. Overman; Ronald C. Hudgens; Ralph J. Skinkiss

[57] ABSTRACT

Method and apparatus are presented for thermally intermixing, blending and homogenizing additive constituents into a molten host glass composition as it flows through a forehearth channel. The additive composition in solid or molten form, is introduced into a thermally rising flow of molten host glass and thermally intermixed therein by successive descending and rising thermal currents.

4 Claims, 2 Drawing Figures

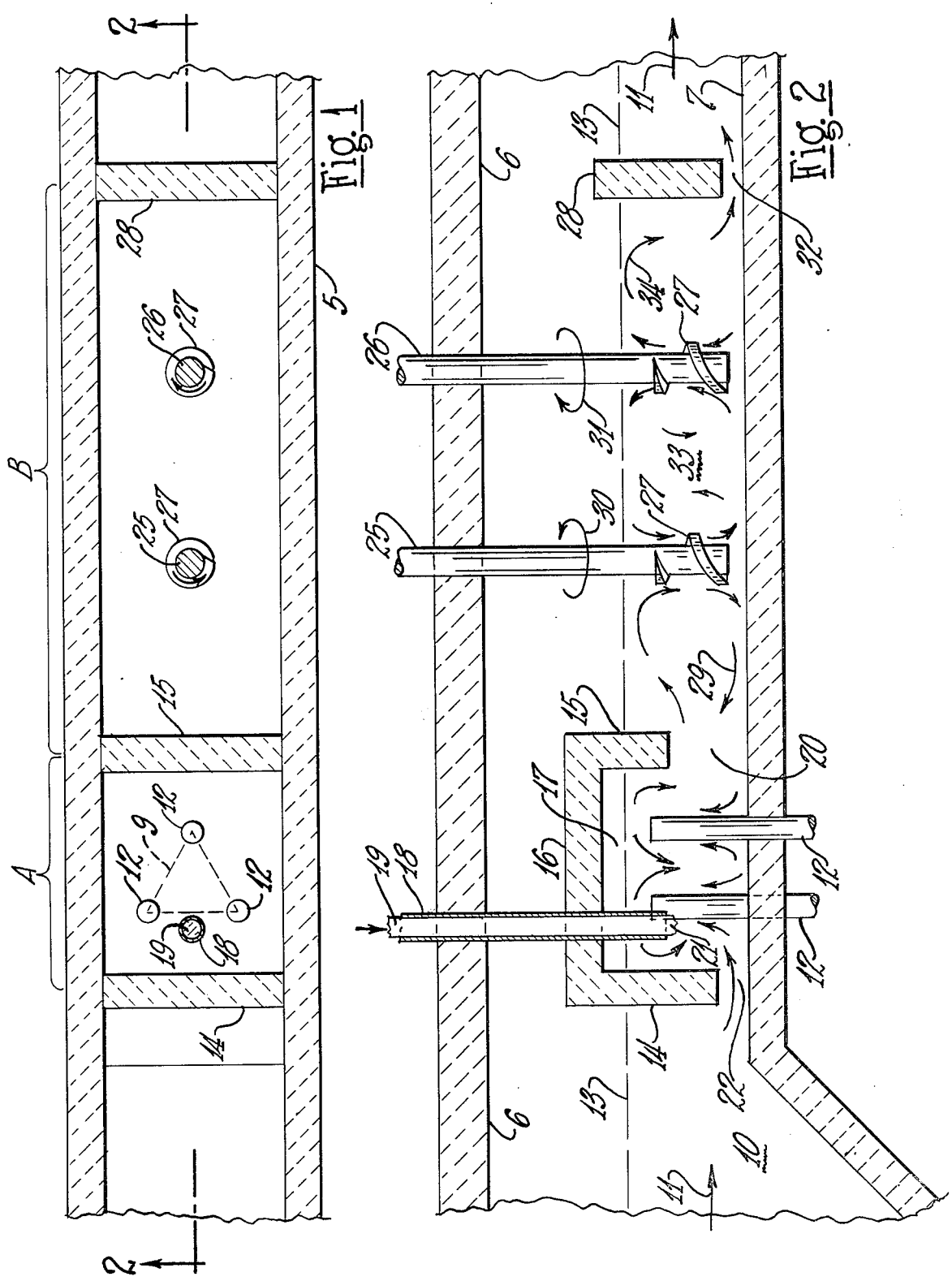

METHOD AND APPARATUS FOR MAKING GLASS

This is a continuation in part of patent application Ser. No. 526,876, filed Nov. 25, 1974 now abandoned.

BACKGROUND OF THE INVENTION

The present invention relates to the art of glass manufacture. More specifically, the present invention provides a novel method and apparatus for blending and mixing an additive into molten glass as it is conveyed through a forehearth channel or the like.

An additive such as frit or batch when added to a molten host glass composition extracts heat from the host. The additive's temperature is thus elevated to its melting point. As the additive temperature rises the host temperature correspondingly decreases. Since the rate of heat transfer is a function of the temperature difference between the heat supplying mass and the mass receiving heat, the rate of heat transfer from host to additive asymptotically approaches zero as the additive approaches the host temperature.

Such a decreasing heat transfer rate is undesirable when the time allowed for blending and homogenizing the host additive mixture is relatively short. Further, extraction of heat by the additive from the host may cause inhomogenities and discontinuities frequently referred to as seeds, stones, striae or mares tails.

Various methods and apparatus for achieving mixing, blending and homogenization have been developed in the past and through advances have been made, most methods still have certain short comings ranging from incomplete mixing to too violent a mixing whereby the very defects, which are intended to be eliminated are in fact exaggerated and increased.

BRIEF DESCRIPTION OF THE INVENTION

Method and apparatus is presented whereby the additive material to be intermixed into the host glass is introduced into a thermally rising current. The thermal current is created by the presence of one or more submerged heating electrodes which add additional heat to a portion of molten host glass in the vicinity thereof. The additional heat added not only creates the thermal current but also supplies at least a portion of the heat required to raise the temperature of the additive material. By the additive extracting heat from the rising thermal of molten host glass the mixture becomes cooler and more dense than the rising thermal thus creating an adjacent downstream descending flow of molten glass.

Successive electrodes may be placed downstream of the initial thermal producing electrode thereby creating alternately rising and descending thermal currents. Thus, the host additive mixture may be thermally blended without an appreciable drop in forehearth temperature.

BRIEF DESCRIPTION OF THE DRAWINGS

FIG. 1 presents a plan view of a forehearth channel embodying the preferred apparatus for practicing the invention.

FIG. 2 presents an elevational view of the forehearth channel shown in FIG. 1 and taken along line 2—2.

PREFERRED EMBODIMENT OF THE INVENTION

FIGS. 1 and 2 present a plan view and sectional elevation respectively of a forehearth section embodying the present invention.

The host glass is prepared and discharged from a typical glass melter (not shown) and flows into thermal mixing region A. Thermal mixing region A comprises a multiplicity of heating electrodes 12 submerged below the molten glass level 13, upstream and downstream baffles 14 and 15 extending into and below the glass melt level 13 and roof 16 extending between baffles 14 and 15 positioned above the melt level 13. Baffles 14 and 15, and roof 16 extend across the full width of forehearth channel 5 thereby entrapping a stagnant atmospheric head 17 above the melt level 13.

Extending through the roof 6 of the forehearth and downward through the thermal chamber roof 16 is conduit means 18 through which the additive 19 is introduced into the host glass stream 10. Conduit 18 may be of any suitable configuration or material. Conduit 18 preferably extends into and below the melt level 13.

Protruding upward through the forehearth floor 7 and into the molten glass stream is a plurality of heating electrodes 12. While any number of electrodes may be used three has been found to be an optimum number to obtain thermal mixing. The three electrodes 12 are symmetrically positioned about the forehearth center line and preferably orientated one to the other as the apexes of an equilateral triangle 9 constructed such that the triangle base is perpendicular to the forehearth center line and an altitude drawn from said base coincides with the forehearth center line. Depending upon the host glass flow parameters and heat input from heating electrodes 12 it may be desirable to configure electrodes 12 as the apexes of an isosceles triangle. In such case the geometric base and altitude of said triangle is again similarly orientated normal and coincident to the forehearth center line. The geometric configuration of electrodes 12 can best be determined empirically for the given system parameters.

The mixing mechanics occurring in the thermal mixing region A are believed to be as follows: The upstream baffle 14 extends downward through the molten glass to close proximity of the forehearth floor 7 thus causing the molten glass to enter region A through entry gate 22 low in the forehearth channel. Exact dimensions of the glass flow gate 22 formed between baffle 14 and forehearth floor 7 is a function of the glass system flow parameters within forehearth 5. Upon passage through gate 22 the host glass enters the zone of influence of the upstream electrodes receiving heat input therefrom. The host glass is thus caused to thermally rise. Additive 19 preferably in a solid phase, is introduced to the thermally rising host glass through conduit exit 21. Heat is thus transfered from the host glass to the additive 19 causing a temperature drop in the fluid system. The glass mixture now being of a higher density than the thermally rising host glass begins to flow downward toward the forehearth floor 7 and enters into the zone of thermal influence of the downstream electrode. Again the glass system is caused to thermally rise. The glas system exits thermal mixing region A and enters mechanical mixing region B through gate 20 formed between baffle 15 and the forehearth floor 7. Gate 20 is configured such that the glass system is permitted to exit region A and enter the mechanical stirring region B high in the glass stream.

During thermal mixing of the additive into the host glass within region A, a portion of unmixed volatile constituents may rise to the surface level of the melt 13. The vapor given off by these surfacing volatile constituents may be trapped within the contained environment 17. Once the contained environment 17 becomes saturated, further gaseous escape from surfacing volatile constituents is prevented.

An alternative technique is to scavenge, by appropriate means, the entrapped gases from area 17 and scrub the withdrawn gases prior to atmospheric release.

As the glass system exits thermal mixing region A it immediately enters mechanical stirring region B. Stirring region B comprises a pair of glass stirring and impelling implements 25 and 26 preferably positioned in tandem arrangement and along the forehearth center line and baffle 28 positioned immediately downstream of stirrer 26. Baffle 28 projects above the melt level 13 and extends across the entire width of forehearth channel 5. Stirrers 25 and 26 may be provided with right hand vanes or spirals as indicated at 27. In such case stirrer 25 is rotated counter clockwise and stirrer 26 clockwise as indicated by arrows 30 and 31 respectively.

The molten glass enters the mechanical stirring region B high in the glass stream as described above. Stirrer 25 by virtue of its counter clockwise rotation drives the molten glass mixture downward while stirrer 26, because of its clockwise rotation, drives the glass upward. Hence a relatively high hydrostatic pressure exists immediately below stirrer 25 while a relatively low pressure is present below stirrer 26. Thus, a back flow or back pressure is created along the forehearth floor 7 as indicated by arrow 29. The presence of said back pressure tends to aid and assist the thermal mixing currents of the downstream electrode in the thermal mixing region A. The fluidic shear forces 33 present between stirrer 25 and 26 provides additional intermixing and blending of the glass system. By the action of stirrer 26 driving the glass flow upward and exit gate 32 being low in forehearth channel 5 the molten glass must necessarily reverse direction, as indicated by arrow 34, in order to exit region B.

Thermal mixing region A combined with mechanical mixing region B provides alternately rising and descending currents of molten glass. The resulting fluidic shear forces caused thereby intermix, blend and homogenize the host additive glass mixture.

Since thermal mixing in zone A is dependent upon the temperature density relationship of the host additive mixture it is important that the additive's temperature density relationship not be significantly different than that of the host. An additive having a molten density significantly lower than that of the host will tend to float upon the surface in chamber 17 and resist the blending action of the descending thermal currents.

It is apparent that, within the scope of the invention, modifications and different arrangements may be made other than as herein disclosed, and the present disclosure is illustrative merely, the invention comprehending all variations thereof.

I claim:

1. A method of thermally mixing an additive into a stream of molten glass flowing through a forehearth channel comprising,
   a. establishing a first thermally rising convective current within said stream of molten glass.
   b. causing said flowing stream of molten glass to approach the first upstream thermal convective current low in the forehearth channel,
   c. introducing said additive into the first convectively rising current of glass at a point below the surface level of molten glass within the forehearth channel,
   d. subjecting the resulting glass system to at least one additional thermally rising convective current.

2. The method claimed in claim 1 wherein said additive is in the melt phase.

3. Apparatus for thermally mixing an additive substance into a molten host glass stream flowing through a forehearth channel comprising a multiplicity of heating electrodes submerged beneath the stream level and configured such that at least two upward rising thermal currents in tandem arrangement one to the other in the longitudinal direction of the forehearth are established, a conduit means projecting into the molten glass stream and in proximity of the most upstream thermal current through which said additive substance is injected into said host glass stream.

4. Apparatus for thermally mixing an additive into a molten glass stream flowing through a forehearth channel comprising an upstream and downstream baffle extending across the width of said forehearth and extending below said molten glass level, said upstream baffle extending into the lower one third of the molten glass depth, and said downstream baffle extending into the upper one third of the molten glass depth, three heating electrodes projecting upward from the forehearth floor and positioned between said upstream and downstream baffles as the apexes of a triangle having its base perpendicular to the forehearth longitudinal center line and its altitude coincident with the said center line and extending downstream from said triangle base, conduit means extending into said molten glass through which said additive is introduced into the molten glass immediately upstream of the electrode triangle base.

* * * * *